United States Patent [19]

Shimano

[11] Patent Number: 4,912,568
[45] Date of Patent: Mar. 27, 1990

[54] HALFTONE DOT IMAGE RECORDING APPARATUS AND METHOD EMPLOYING HIGH DENSITY SCREEN PATTERN SIGNAL FOR LIGHT BEAM MODULATION

[75] Inventor: Noriyuki Shimano, Kyoto, Japan
[73] Assignee: Dainippon Screen Mfg. Co., Ltd., Kyoto, Japan
[21] Appl. No.: 160,155
[22] Filed: Feb. 25, 1988

[30] Foreign Application Priority Data

Feb. 27, 1987 [JP] Japan .................................. 62-46496

[51] Int. Cl.$^4$ .............................................. H04N 1/40
[52] U.S. Cl. ................................... 358/457; 358/298; 358/456
[58] Field of Search ............... 358/283, 298, 455, 456, 358/457, 458, 459, 460

[56] References Cited

U.S. PATENT DOCUMENTS 4,450,485  5/1984  Oshikoshi et al. .................. 358/283
4,780,768  10/1988  Tomohisa et al. .................. 358/283

FOREIGN PATENT DOCUMENTS 57-99864  6/1982  Japan .................................. 358/283
58-85671  5/1983  Japan .................................. 358/298
60-182863  9/1985  Japan .................................. 358/298
60-214672  10/1985  Japan .................................. 358/298
61-61566  3/1986  Japan .
62-18170  1/1987  Japan .

Primary Examiner—James J. Groody
Assistant Examiner—Randall S. Svihla
Attorney, Agent, or Firm—Lowe, Price, LeBlanc, Becker & Shur

[57] ABSTRACT

Apparatus is provided for recording halftone dot images on a photosensitive material by emitting a light beam which is modulated in accordance with digital image data. In a screen pattern memory (23), screen pattern data provided with a value for each element area which is smaller than a light spot diameter of a light beam on a surface of a photosensitive material is stored. The level of a screen pattern signal obtained from the screen pattern data and that of an image signal obtained from digital image data are compared in a comparator (22). An intensity of the light beam is modulated according to a result of comparison in the comparator (22). Because the screen pattern signal is given as a high density signal, the light beam is modulated in each element area which is smaller than a light spot diameter.

14 Claims, 18 Drawing Sheets

SCREEN PATTERN DATA IN MEMORY

| 0 | 72 | 136 | 64 | 48 |
|---|---|---|---|---|
| 80 | 144 | 192 | 128 | 120 |
| 152 | 209 | 255 | 239 | 184 |
| 88 | 160 | 223 | 176 | 112 |
| 16 | 96 | 168 | 104 | 32 |

FIG. 6
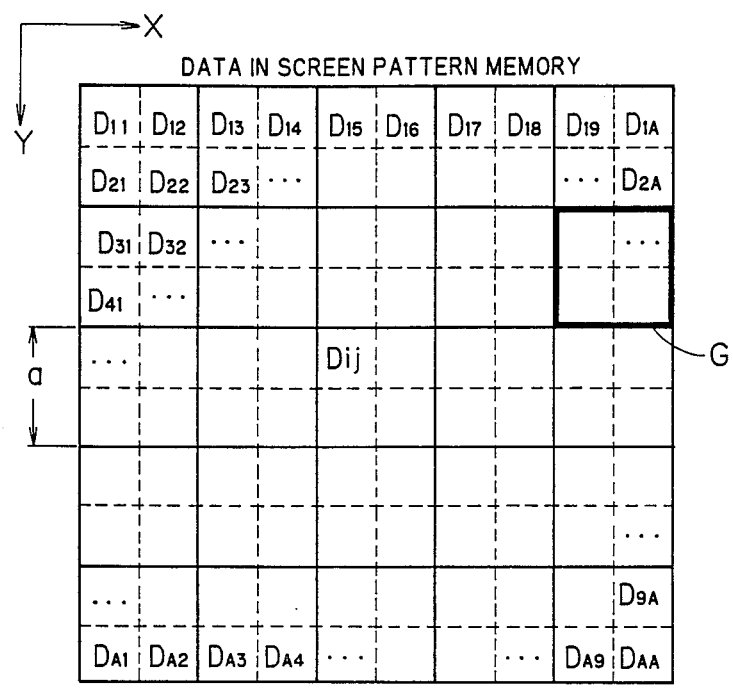
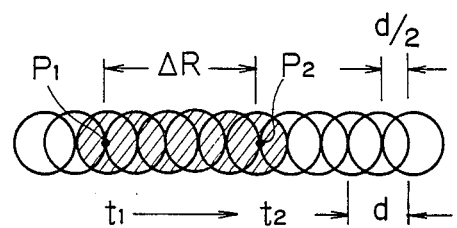
FIG.8(a)
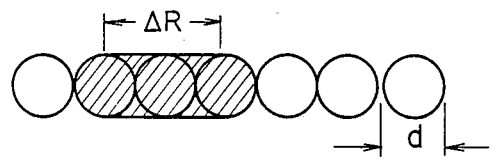
FIG.8(b)
(PRIOR ART)

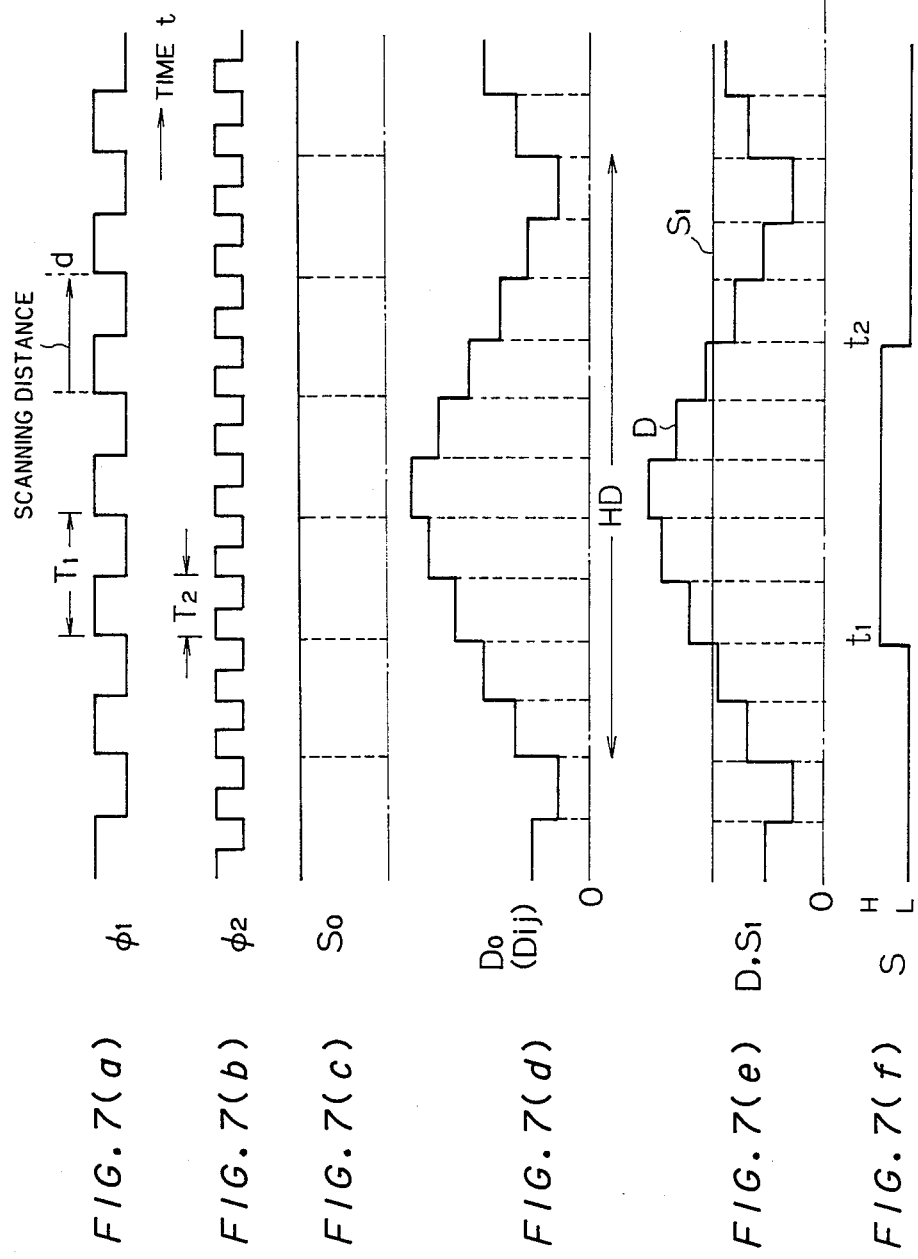

$$F_{11} \equiv \frac{D_{11}+D_{12}+D_{21}+D_{22}}{4}$$

$$F_{12} \equiv \frac{D_{12}+D_{13}+D_{22}+D_{23}}{4}$$

$$F_{21} \equiv \frac{D_{21}+D_{22}+D_{31}+D_{32}}{4}$$

$$F_{22} \equiv \frac{D_{22}+D_{23}+D_{31}+D_{32}}{4}$$

—— = FIRST LINE
---- = SECOND LINE
— — = THIRD LINE

HALFTONE DOT IMAGE RECORDING APPARATUS AND METHOD EMPLOYING HIGH DENSITY SCREEN PATTERN SIGNAL FOR LIGHT BEAM MODULATION

BACKGROUND OF THE INVENTION

1. Field of the Invention

The invention relates to a halftone dot image recording apparatus wherein density of a screen pattern signal is increased thereby to substantially enchance reproducibility of gradation.

2. Description of the Prior Art

In a halftone dot image recording apparatus such as a process scanner of electronic control type, a level of an image signal is compared with a level of a prescribed screen pattern signal, and a photosensitive material is scanned by an exposure of light beam which is turned on and off according to a result of such comparison, to record a halftone dot image thereon. The screen pattern signal is generated based on the screen pattern data which are prepared previously.

As well known in the art, the screen pattern data express a threshold level distribution in the halftone dot in which a small area $A_{ij}$ shown in FIG. 1 (hereinafter called as "unit area") is employed as a quantized space unit, and the unit area $A_{ij}$ is obtained by dividing one halftone dot HD into lattice or matrix. FIG. 2 shows a state in which the screen pattern data prepared for the halftone dot HD of FIG. 1 is stored in a memory and numerals in FIG. 2 represent data value given to each unit area $A_{ij}$. A shaded unit area shown in FIG. 1 represents an area which has a screen pattern data that is greater than "128" and a region on the photosensitive material corresponding to the shaded area is exposed by the light beam in recording a halftone dot with respect to an image signal having a level of "128".

The size of the unit area $A_{ij}$ is determined according to light spot diameter d of the light beam to expose at a position on an image recording surface of the photosensitive material. More specifically, the size of the unit area $A_{ij}$ is determined so that the light spot diamter d will be a range of 0.75 to 1.5 times a length a of one side of the unit area $A_{ij}$ (the length of the side is hereafter called as "unit area size"). In FIG. 1, a diameter of a circle which inscribes the unit area $A_{ij}$ is employed as the light spot diameter d for convenience of illustration.

Turning on and off of the light beam for exposure is judged every time a scanning is advanced by a distance according to the light spot diameter d, and the intensity of the light beam is subjected to turning on and off according to the results of the judgement. Therefore, in a conventional halftone dot image recording apparatus, a space interval capable of the beam intensity change is restricted to the integral multiples of the unit area size a.

As a result, in a square halftone dot having a screen pitch K where the following relation (1) holds, $$K = Na \quad (N \text{ is an intergral number}) \quad (1)$$

gradation number of recorded image has a maximum value M of:

$$M = (K/a)^2 = N^2 \quad (2)$$

Therefore, in order to increase the gradation number M, it is necessary to increase the value (K/a) in the formular (2). In a flat bed type scanner, however, since it is necessary to secure a certain degree of scanning length, long focal distance of an image forming lens of a recording optical system must be provided. Therefore, in the flat bed type scanner, the light spot diameter of the light beam for exposure at a position of the photosensitive material cannot be made too small, and to realize the light spot diameter of about 15 to 16 $\mu$m for example involves extremely technical difficulties and increased costs. Consequentially, in the flat bed type scanner, the unit area size a is also relatively large and there exists a condition where the gradation number M is compelled to become small according to the formula (2).

In a drum type scanner which is capable of making the light spot diameter d and the unit area size a to be relatively small as well, when the screen pitch K is small, the gradation number M also becomes low according to the formula (2).

As stated above, in the conventional halftone dot image recording apparatus, there is a problem wherein the gradation number is low when the ratio of the screen pitch K to the unit area size a cannot be made large, and the gradation reproducibility of the recorded becomes reduced.

Furthermore, because there is a necessity to secure the spatial periodicity of the halftone dot in the image recording, the screen pitch K depends upon the size of the light spot diameter d (therefore the unit area size being a). In an example of the halftone dot having a screen angle of 0° as shown in FIG. 1, the screen pitch K is restricted by the integer multiple of the unit area size a. Therefore, in a conventional apparatus, there is a problem of low degree of freedom in selection of the screen pitch.

SUMMARY OF THE INVENTION

The present invention is directed to an apparatus for recording halftone dot images on photosensitive material on the basis of digital image data. According to the present invention, the apparatus comprises (a) image signal generating means for generating image signals on the basis of digital image data, (b) screen pattern signal generating means for generating a periodic screen pattern signal, (c) comparing means for comparing a level of said image signal and a level of said screen pattern signal, (d) light beam generating means for generating a light beam to be irradiated on a photosensitive surface of said photosensitive material, said light beam having a prescribed light spot diameter on said photosensitive surface of said photosensitive material, (e) intensity modulating means for modulating an intensity of said light beam according to a result of a comparison in said comparing means, (f) scanning means for relatively moving said light beam and said photosensitive materials thereby to scan said photosensitive surface by said light beam. According to the present invention, said screen pattern signal generating means has (b-1) high density screen pattern signal generating means for generating a high density screen pattern signal whose levels are changed at time intervals shorter than a time interval in which a scanning by said scanning means advances by said light spot diameter on said photosensitive surface, and (b-2) a high density screen pattern signal transfer means for transferring said high density screen pattern signal to said comparing means as said screen pattern signal.

According to a preferred embodiment of the present invention, the screen pattern data are stored in a memory means, said screen pattern data are provided with values for each element area on said photosensitive surface which is smaller than said light spot diameter, and said high density screen pattern signals are generated on the basis of said screen pattern data.

According to another embodiment of the present invention, high density screen pattern signals are generated through interpolation process.

According to further another embodiment of the present invention, the high density screen signal may be an analog screen pattern signal. The image signal may also be an analog image signal.

The present invention is also directed to provide a method to record halftone dot images on the photosensitive material on the basis of the digital image data. This method has a step for generating a high screen pattern signal whose level changes at the time intervals which are shorter than the time interval in which the scanning advances by the light spot diameter of the light beam. When the analog screen pattern signal are used as the high density screen pattern signal, said time intervals at which the high density screen pattern signal varies is substantially zero.

Accordingly, an object of the present invention is to provide a halftone dot recording apparatus which is capable to substantially increase the gradation reproducibility of a recorded image and has a high degree of freedom in selection of the screen pitch even when a ratio of a screen pitch to a light spot diameter of a light beam for exposure is not large.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5A-5C and FIG. 6 are explanatory drawings showing the screen pattern data of the first embodiment;

FIGS. 7(a)-7(f) are the timing charts showing operations of the first embodiment;

FIGS. 8(a), 8(b), 9(a) and 9(b) are explanatory diagrams wherein exposure condition according to the first embodiment is compared with that of the conventional apparatus;

DETAILED DESCRIPTION OF THE PREFERRED EMBODIMENTS

A. Overall construction of embodiments

Figure 3:
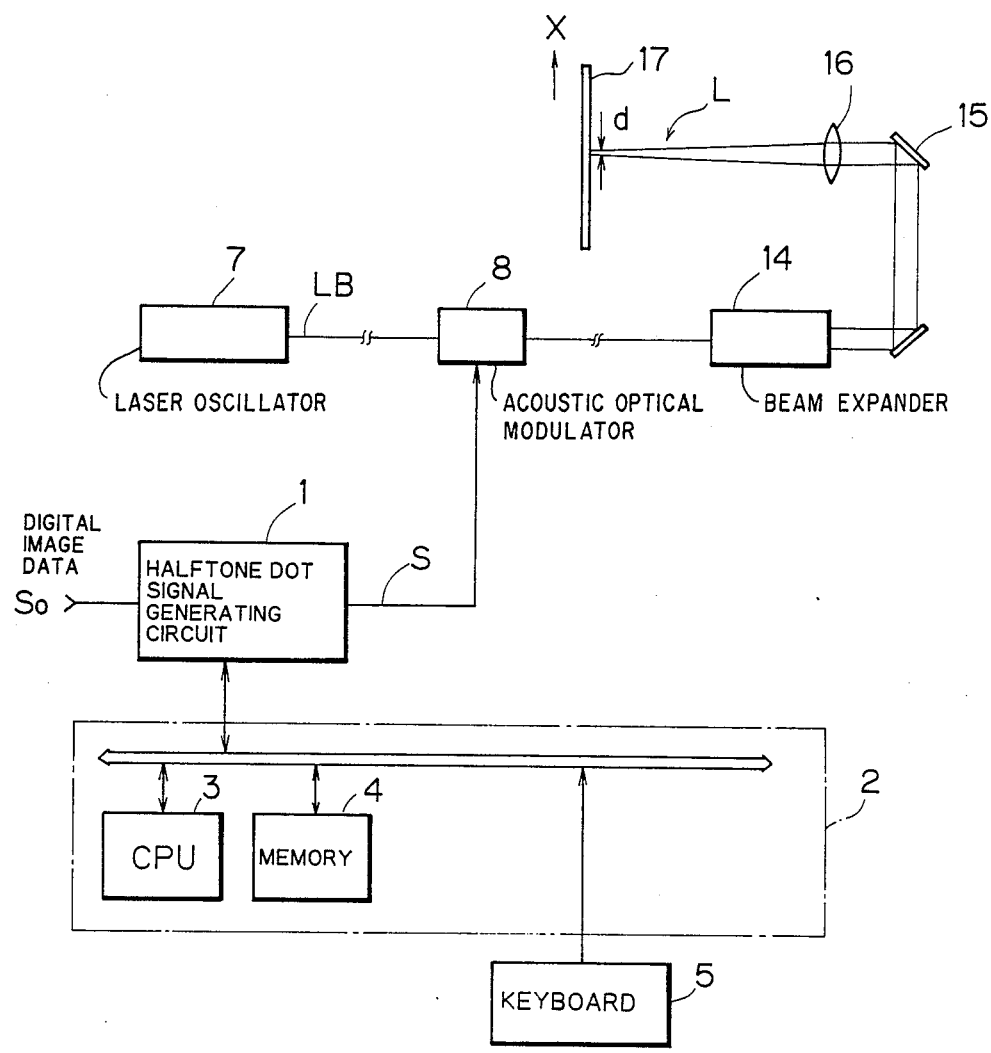
FIG. 3 is a diagram showing overall structure common to all embodiments of the present invention applied to a flat bed type scanner.

FIG. 3 is a diagram showing an overall structure of an embodiment applied to the flat bed type process scanner according to the present invention. In this application, a plurality of embodiments is disclosed but the configuration shown in FIG. 3 is common to all embodiments.

In FIG. 3, a digital image data $S_0$ which contains image information to be recorded is inputted into a halftone dot signal generating circuit 1 having a detailed structure described later. The halftone dot signal generating circuit 1 generates an exposure output signal S which gives a halftone dot image based on the digital image data $S_0$ inputted sequentially along scanning lines. The halftone dot signal generating circuit 1 is connected to a microcomputer 2 which is used for control of operations. This microcomputer has a CPU 3 and a memory 4 and is connected to a keyboard 5 for inputting operation signal.

A laser beam LB generated in a laser oscillator 7 as a light source for recording exposure is intensity-modulated in an acoustic optical modulator (AOM) 8 in response to the exposure output signal S and inputted into a beam expander 14. The beam expander 14 expands the inputted light beam in diameter. A laser beam L outputted from the beam expander 14 reaches a galvanomirror (or polygonal rotary mirror) 15 to be deflected for scanning, and is irradiated onto a photosensitive surface of a photosensitive material 17 through a $f\theta$ lens 16. The laser beam L has a light spot diameter d on the photosensitive surface of the photosensitive material 17.

A main scanning is accomplished by moving the laser beam L periodically to X direction by vibration of the galvanomirror 15 or the rotation of the polygonal rotary mirror provided instead of the galvanomirror 15. A subscanning is accomplished by moving the photosensitive material 17 to the direction perpendicular to a plane on which FIG. 3 is drawn. As a result, a scanning exposure of the photosensitive material 17 is accomplished whereby a halftone dot image is recorded on the photosensitive material 17 on the basis of the digital image data $S_O$.

B. Detail construction and operation of the first embodiment

Figure 4:
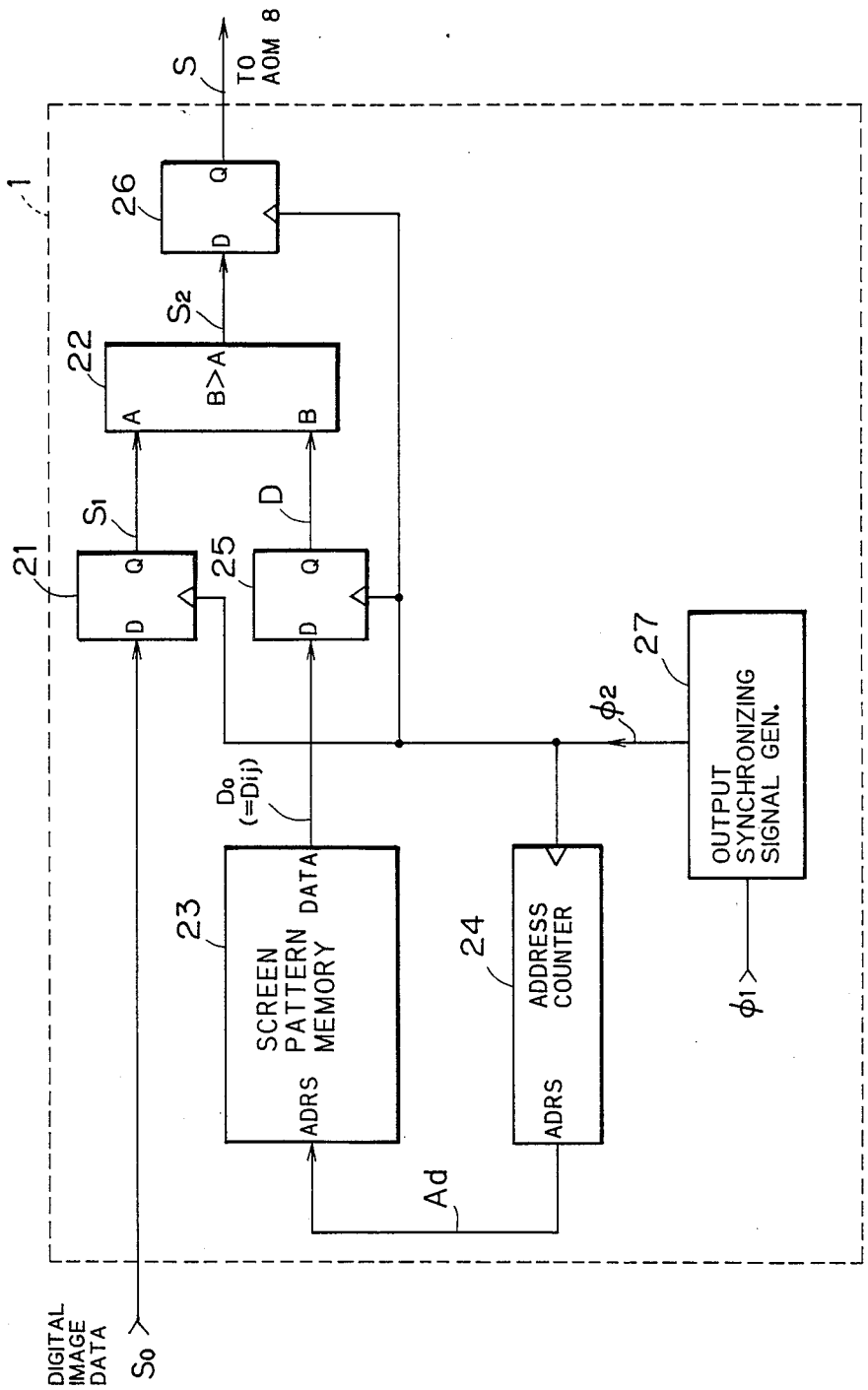
FIG. 4 is a diagram showing an internal structure of first embodiment.

FIG. 4 is a diagram of an internal structure of the halftone dot signal generating circuit 1 according to the first embodiment. In FIG. 4, the inputted digital image data $S_O$ is latched periodically by a flip flop (hereafter called "F/F") 21 to be outputted from the same as an image signal $S_1$. The image signal $S_1$ is given to an input A of a comparator 22.

On the other hand, in the halftone dot signal generating circuit 1, a screen pattern memory 23 is provided in which a digital screen pattern data is stored previously. The pattern data to be stored in the screen pattern memory 23 has four times the spatial density (two times the spatial density when only one scanning direction is considered) of the conventional screen pattern data provided for the same screen pitch and the light spot diameter.

Figures 1, 2:
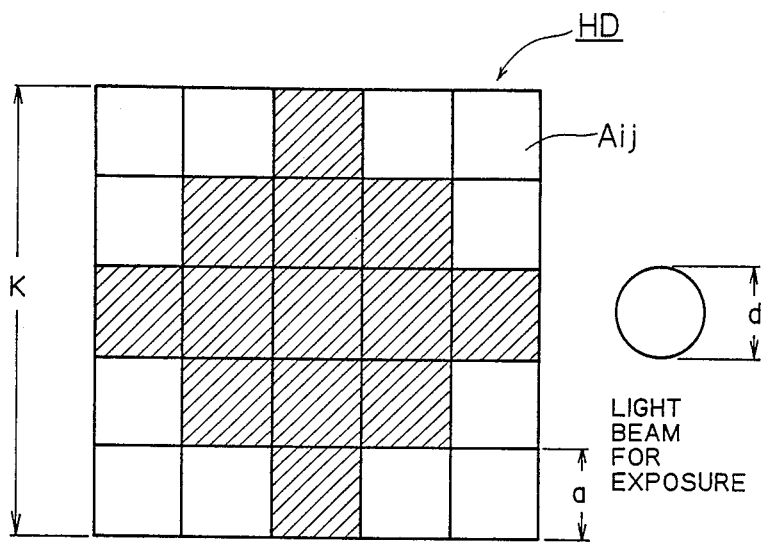
FIG. 1 is a diagram showing a screen pattern data in a conventional apparatus.
FIG. 2 is an explanatory diagram showing an expression of gradation according to a conventional apparatus.
Figure 5C:
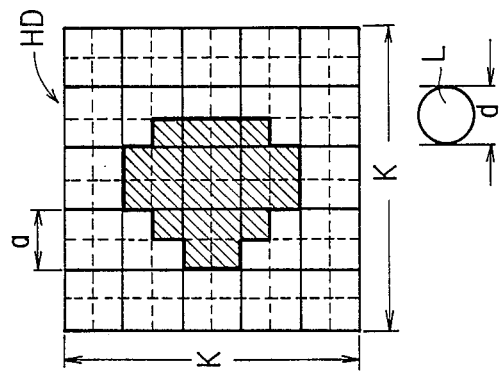
Figure 5B:
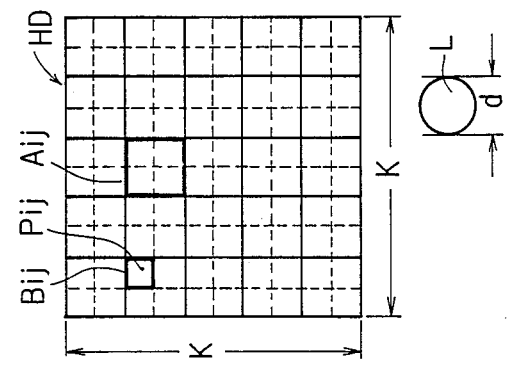
Figure 5A:
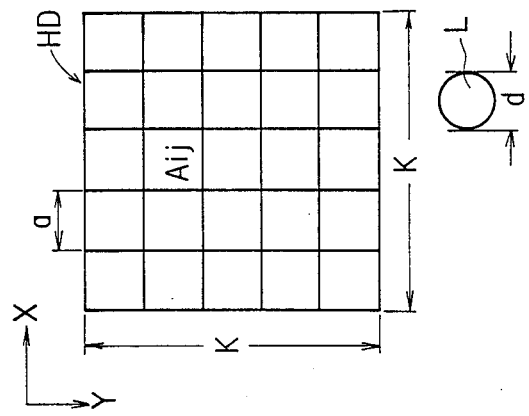

In an example of a halftone dot HD shown in FIG. 5A, a conventional screen pattern data is prepared as shown in FIG. 1 which consists of 25 data (5×5=25), while a high density screen pattern data consisting of 100 data $D_{ij}$ (i,j=1~5), (5×2)×(5×2)=25×4=100, is prepared and stored in the embodiment, as shown in FIG. 6. Namely, four data in a square G in FIG. 6 are prepared for each of a unit area corresponding to the light spot diameter d. In FIG. 6, the symbol X and Y represent a main scanning direction and a subscanning direction, respectively. For the convenience of explanation, a screen angle is set as 0° and the screen pitch is set as K.

Values of the screen pattern data $D_{ij}$ are determined by a mathematical function expressing a screen pattern. In other words, when the main scanning coordinates is expressed as X and the subscanning coordinates as Y, and an element area $B_{ij}$ (i,j=1-10) obtained by halving vertically and horizontally each unit area $A_{ij}$ shown in FIG. 5A which has a size according to the light spot diameter d, is considered (refer to FIG. 5B), X and Y coordinates of the center position $P_{ij}$ of these element areas $A_{ij}$ are substituted into a prescribed two dimensional screen pattern function D (X, Y) to obtain value of each data $D_{ij}$. This screen pattern function D (X, Y) may be determined according to a desired standard gradation reproduced character and may be determined by using an arbitrary function (a trigonometrical function, for example). The value of the high density screen pattern data $D_{ij}$ may be determined by interpolating the conventional density screen pattern data shown in FIG. 1, for example.

The unit area $A_{ij}$ having a unit area size a is halved vertically and horizontally to form an element area $B_{ij}$ in this embodiment. In general, the unit area $A_{ij}$ may be divided into n columns aligned along the main scanning direction and further divided into m rows aligned along the subscanning direction thereby to obtain the (n×m) element areas $B_{ij}$ whose size is smaller than the light spot diameter d in the main scanning direction and/or subscanning direction.

These numbers n and m are a set of positive integers at least one of which is equal to or greater than two. These numbers n and m may be an arbitrary positive number at least one of which is greater than one.

Now back to FIG. 4, in an address input ADRS of the screen pattern memory 23 which stores the high density screen pattern data $D_{ij}$, an output $A_d$ of an address counter 24 is provided. The screen pattern data $D_O$ (=$D_{ij}$) which is outputted in time series from the screen pattern memory 23 is latched by F/F 25 to be a screen pattern signal D given to an input B of the comparator 22. The comparator 22 outputs a signal $S_2$ which becomes a level "H" only when the input B is greater than the input A, and this signal $S_2$ is latched by F/F 26 and becomes an exposure output signal S.

An output synchronizing signal generator 27 is a circuit which inputs first clock signal $\phi_1$ which is synchronized with the input timing of the digital image data $S_0$ and outputs a second clock signal (output synchronizing signal) $\phi_2$ which has a pulse frequency of two times that of the first synchronizing signal $\phi_1$. In general, the pulse frequency of the second clock signal $\phi_2$ may be n times of that of the first clock signal $\phi_1$, where the number n is a positive number greater than one.

When a scanning speed is expressed as v, the first clock signal $\phi_1$ is a pulse signal having repeat frequency f expressed by the following formula;

$$f=(d/v)^{-1} \qquad (3)$$

whereas the repeated frequency F of the second clock signal $\phi_2$ is expressed by the following formula as;

$$F=2f \qquad (4)$$

The second clock signal $\phi_2$ is used as an input pulse of the address counter 24 and is also used as the latching signal of F/F 21, 25, and 26.

Operations of the circuit shown in FIG. 4 will now be described with reference to a timing chart shown in FIG. 7, in which time delay in latching operation or the like is ignored in FIG. 7. The first clock signal $\phi_1$ (FIG. 7(a)) which is synchronized with the input timing of the digital image data $S_O$ is supplied to the output synchronizing generator 27, thereby the second clock signal $\phi_2$ (FIG. 7(b)) is generated. In synchronism with the second clock signal $\phi_2$, the digital image data $S_0$ is latched by F/F 21 to generate the image signal $S_1$ in time series. In this example, a case where the digital image data $S_0$ (FIG. 7(c)) is a constant level data is considered, thereby the image signal $S_1$ (FIG. 7(e)) also becomes a constant level signal. The digital image data $S_0$ may be a variable data. Further, the digital image data $S_0$ is not necessarily generated in synchronism with the first clock signal $\phi_1$ but may be generated in synchronism with a signal corresponding to more rough sampling pitch.

On the other hand, by counting the second clock signal $\phi_2$, the address counter 24 generates an address signal $A_d$ which sequentially access to the screen pattern data $D_{ij}$ of FIG. 6 in the memory 23, while repeating from $D_{11}$ to $D_{1A}$. By this operation, the pattern data $D_0$ (=$D_{ij}$) shown in FIG. 7 (d) is repeatedly read out from the screen pattern memory 23 with a period of one halftone dot to be latched by F/F 25 thereby to become a periodic screen pattern signal D (FIG. 7(e)).

Respective levels of the image signal $S_1$ and the screen pattern signal D are transferred to a comparator 22 through transfer lines and compared by the comparator 22 for every repeated cycle of the second clock signal $\phi_2$ and the signal $S_2$ which becomes the level "H" only when D is greater than $S_1$ is outputted. For this reason, the exposure output signal S obtained by latching the signal $S_2$ by F/F 26 has a waveform shown in FIG. 7(f). In the example shown in FIG. 7(f), an exposure output signal S which becomes "H" in a time range of $t_1 < t < t_2$ is obtained.

On the other hand, the scanning speed v of the laser beam L in the main scanning direction is so selected that the main scanning advances by the distance according to the light spot diameter d for every pulse period $T_1$ of the first clock signal $\phi_1$, as shown in FIG. 7(a). In other words, a time required for the scanning to advance by the light spot diameter d is $T_1$. The screen pattern signal D is a high density signal whose level changes for every pulse period $T_2$ (=$T_1/2$) of the second clock signal $\phi_2$ (that is, for every scanning distance of half the light spot diameter d). The level changing interval of the screen pattern signal D is shorter than the scanning distance according to the light spot diameter d and the high density screen pattern signal D is generated. The comparison by the comparator 22 and the intensity change control (modulation control) of the laser beam L based on the comparison are accomplished at the high density having a period of $T_2$.

Therefore, as shown in FIG. 8(a), the spot center of the laser beam L is located in positions $P_1$ and $P_2$ when the intensity of the light beam L is changed at the times $t_1$ and $t_2$, respectively, and the distance $\Delta R$ between the intensity changing positions $P_1$ and $P_2$ is integral multiples of half the light spot diameter d.

In case of a conventional apparatus, as shown in FIG. 8(b), the screen pattern data for every scanning distance (unit area size a) are prepared according to the light spot diameter d as shown in FIG. 1 and respective signal processings are caused in synchronism with the first clock signal $\phi_1$ only. Therefore, ON/OFF intensity change control of the laser beam is accomplished each time the scanning advances by the light spot diameter d, and the distance $\Delta R$ between intensity changing positions $P_1$ and $P_2$ becomes integer multiples of the light spot diameter d.

In the present embodiment, the recording density of the main scanning direction is substantially two times the conventional recording density, when the same light spot diameter d is employed.

Figure 9A:
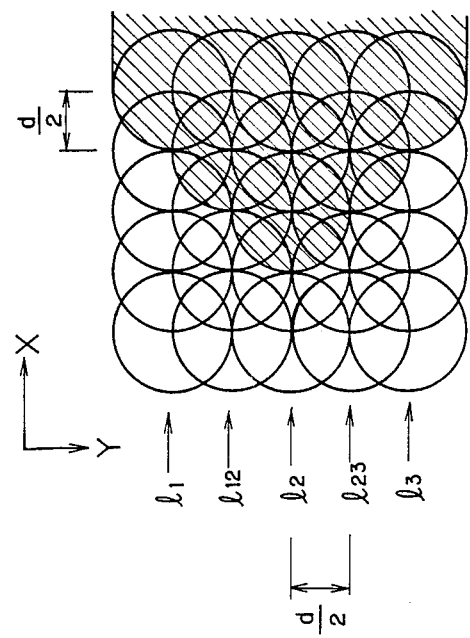

Almost the same processing is accomplished with respect to the subscanning direction, but unlike the case of the main scanning direction, the scanning speed (that is, the moving speed of the photosensitive material 17 in (−Y) direction) is taken as a half the conventional moving speed (generally, it is (1/m) times the conventional moving speed where m is a positive number greater than one). In other words, the adjoining or mutually neighbouring scanning lines are overlapped with each other by the half thereof as shown in FIG. 9(a), and each line $D_{1j}$, $D_{2j}$, . . . shown in FIG. 6 is correlated with each scanning line, so that exposures with high density are accomplished in the subscanning direction. The scanning lines are substantially defined on the photosensitive surface of the photosensitive material 17 by the main scanning, and the laser beam L is scanned along the scanning line.

In this case, with respect to the digital image data $S_0$ of inserted scanning lines ($l_{12}$, $l_{23}$, . . . of FIG. 9 (a)) for example, the digital image data for the scanning lines $l_1$, $l_2$, . . . aligned with a interval of the light spot diameter d may be used. An interpolation for the inserted scanning lines is performed along the subscanning direction. In this embodiment, an interpolation circuit (not shown in FIG. 2) is provided in the preceding stage of the halftone dot signal generating circuit 1 for the interpolation of the digital image data. With respect to other embodiments discribed later, the interpolation circuit is provided as long as the improvements according to the present invention are employed in connection with the subscanning direction. The same image data for the scanning lines $l_1$ and $l_2$ may be repeatedly used without the interpolation. High resolution image data also be used and furthermore, it is possible to use the same image data for more than two scanning lines.

Figure 9B:
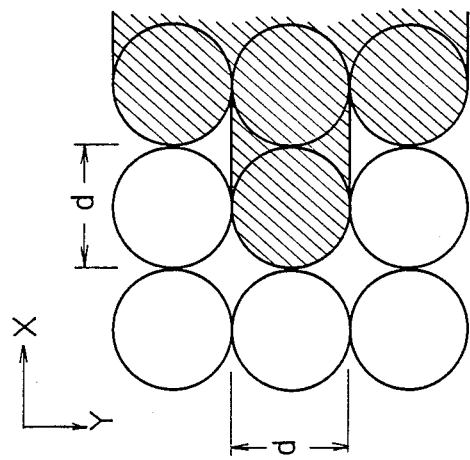

In case the present invention is applied to the subscanning direction, the screen pattern signal D is increased in its density by causing its level to change along the subscanning direction for every distance (d/2) which is shorter than the subscanning distance defined by the light spot diameter d. In accordance with an increase in the density of scanning lines, intensity change control frequency (control density) of the laser beam L is also increased. FIG. 9(b) represents an example of the exposure pattern of a conventional apparatus, wherein exposures are accomplished by causing the levels of the screen pattern signal to change for every light spot diameter d in all scanning directions.

An example of a halftone dot image exposed in above manner is shown schematically in FIG. 5C. As understood by the comparison with the case shown in FIG. 1, the exposure pattern of this embodiment is a fine pattern and that the reproducibility of gradation is substantially improved. Furthermore, an exposure pattern substantially equivalent to the case where the exposure control is accomplished for each element area $B_{ij}$ is obtained, it is possible to use an arbitrary integer multiples (but equal to or greater than two times) of half the light spot diameter d as the screen pitch, thereby improving the degree of feedom in screen pitch selection (thus the number of screen lines).

In case the number of divisions (n×m) of the unit area $A_{ij}$ is to be a variable number depending upon a factor such as the screen size and the light spot diameter, screen patterns of different number divisions may be prepared separately and used selectively. Alternatively, only a screen pattern having the greatest number of divisions may be prepared, and in this case, a screen pattern of lower division number may be obtained by skipping the data in the screen pattern of the greatest number of divisions. In later case, there is an advantage that a necessary memory capacity required for a storage of screen pattern data is required.

In the first embodiment, even if the number of divisions is increased, it is only necessary to increase the data for the screen pattern, which in turn provides a merit where the construction of the circuits is not complicated.

C. Detail of construction and operation of the second embodiment

Figure 10A:
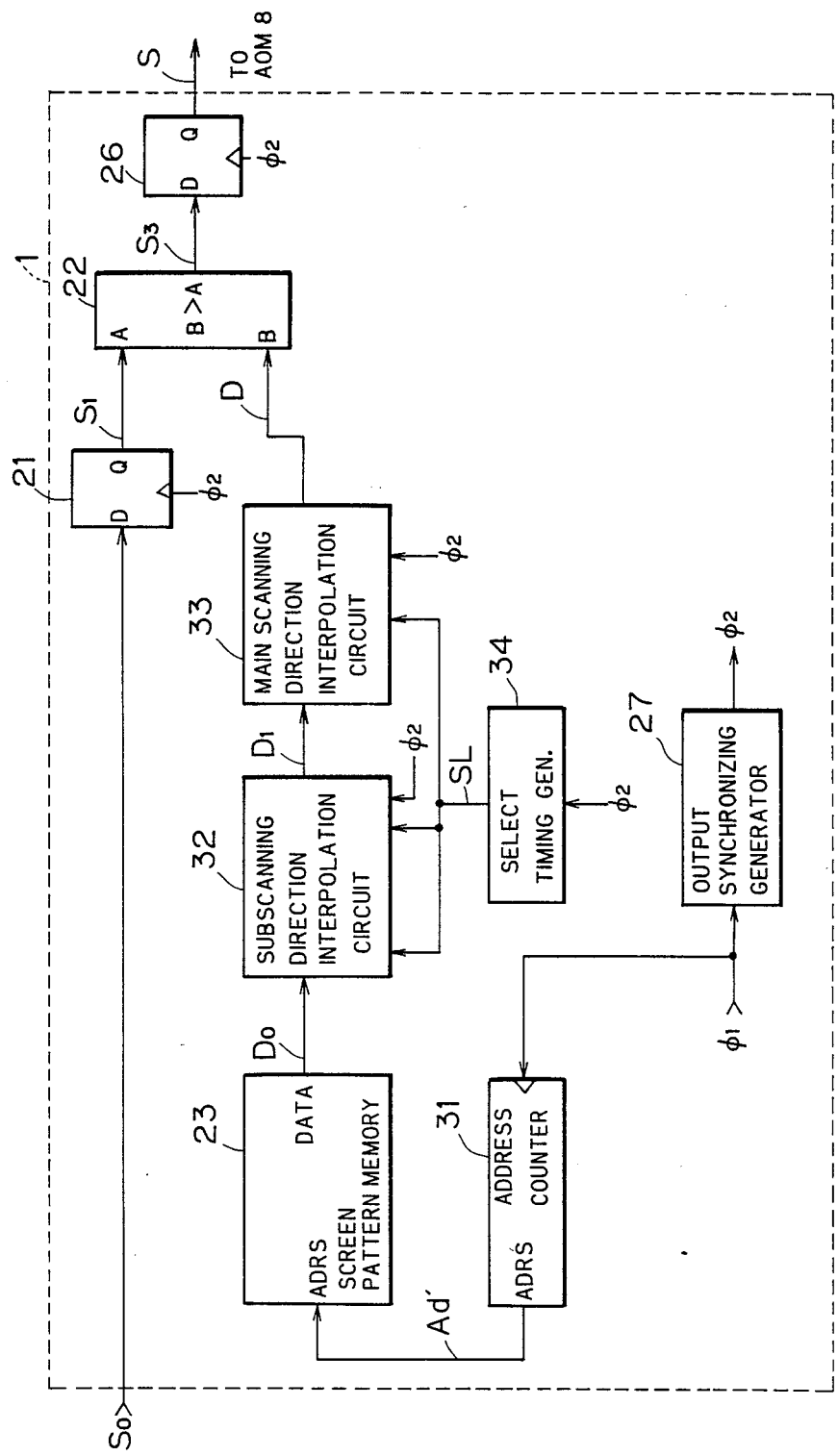
FIG. 10A through FIG. 10C are diagrams showing second embodiment.
Figure 10B:
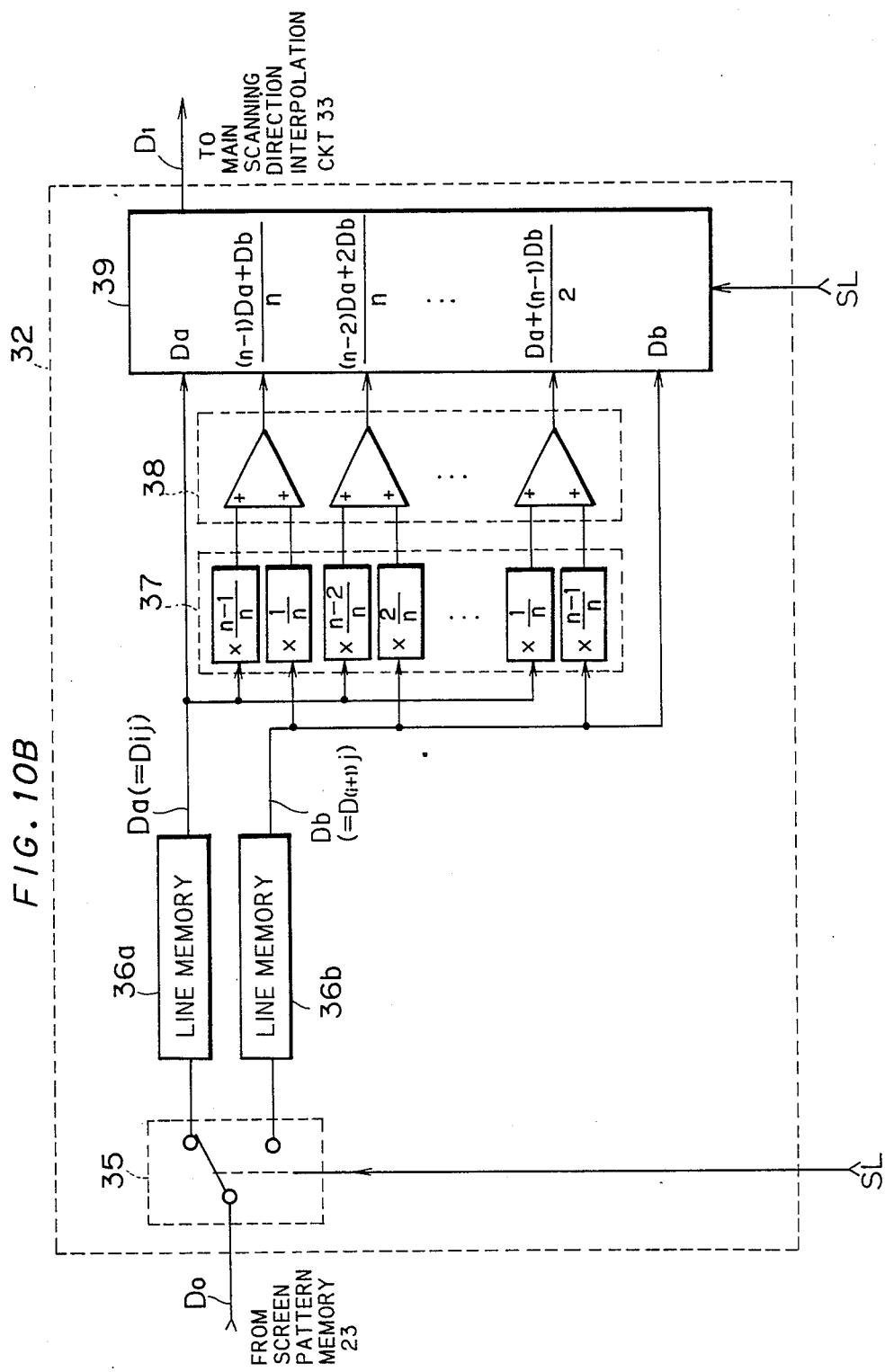
Figure 10C:
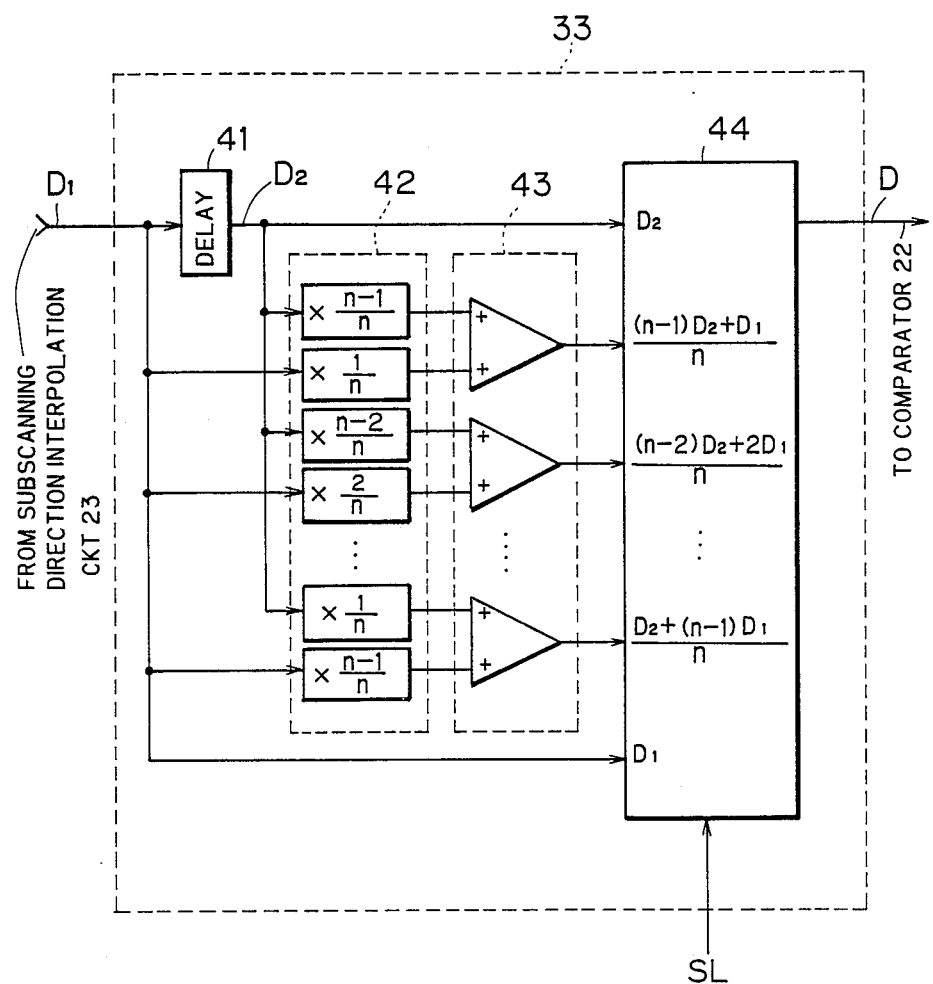

FIG. 10A through FIG. 10C show inner construction of the halftone dot signal generating circuit 1 which are used in the second embodiment of the present invention. In the following description, portions which are different from the first embodiment will be described mainly.

In the second embodiment, the same screen pattern data whose values are given for each unit area $A_{ij}$ similarly to the conventional apparatus (data shown in FIG. 2 for example) are stored in the screen pattern memory 23 of FIG. 10A. The address counter 31 counts the first clock signal $\phi_1$ so as to generate an address signal $A_d'$. Therefore, the screen pattern data $D_0$ is outputted from the screen pattern memory 23 in synchronism with the first clock signal $\phi_1$ *and this data* $D_0$ is outputted to a subscanning direction interpolation circuit 32. The data $D_0$ is interpolated along the subscanning direction by the operation described later to obtain an interpolated screen pattern data $D_1$. The data $D_1$ is supplied to a main scanning interpolation circuit 33 for every scanning line to be interpolated along the main scanning direction in the interpolation circuit 33, thereby to obtain a screen pattern signal D interpolated along the main scanning and the subscanning directions. The signal D is given to the comparator 22 in the same manner as the first embodiment.

In the following description, an example in which a distance equivalent to the light spot diameter d is divided into n parts in both of the main scanning direction and the subscanning direction will be described. The second clock signal $\phi_2$ has a pulse frequency of n times the pulse frequency of the first clock signal $\phi_1$. The interpolation circuits 32, 33 and a selection timing generating circuit 34 and the like described later operate in synchronism with the second clock signal $\phi_2$.

In the subscanning interpolation circuit 32, a switching circuit 35 in FIG. 10B alternately selects line memory 36a and 36b in response to a selection signal SL generated in the selection timing generating circuit 34, and the screen pattern data $D_0$ for each one line is transferred from the screen pattern memory 23 sequentially along the subscanning direction to be alternately stored in the line memory 36a and 36b.

Each time the screen pattern data $D_0$ for one line is stored in these line memory 36a or 36b, the screen pattern data $D_{ij}$, $D_{(i+1)j}$ of the unit areas having the same main scanning coordinates are read out from the memory 36a and 36b, respectively, along the main scanning direction. The data read out from the memory 36a and 36b are expressed as data $D_a$ and $D_b$, respectively. The data $D_a$ and $D_b$ are processed by a multiplier group 37 and an adder group 38 to obtain (n+1) number of data interpolating the data $D_{ij}$, $D_{i(j+1)}$ through the following formula, which are supplied to the selector 39.

$$[(n-k) D_a + kD_b]/n (k=0.1, \ldots, n) \quad (5)$$

The (n+1) number of input of the selector 38 are sequentially selected in response to the selection signal SL and the screen pattern data are outputted along the main scanning direction from the line memory 36a and 36b in each selected condition. The interpolated data of each interpolation line is sequentially outputted as the data $D_1$ from the selector 39.

In the main scanning direction interpolation circuit 33 of the following stage (FIG. 10C), the data $D_1$ inputted along the main scanning direction is supplied to the delay circuit 41 and is delayed in this delay circuit 41 by one clock of the second clock signal $\phi_2$ to obtain the data $D_2$. The data $D_1$ inputted next and the data $D_2$ are operated by an adder group 42 and a multiplier group 43 to obtain (n+1) number of data by interpolating the data $D_1$ and $D_2$ in the main scanning direction through the following formula:

$$[(n-k) D_2 + kD_1]/n \ (k=0, 1, \ldots, n) \quad (6)$$

Figure 11A:
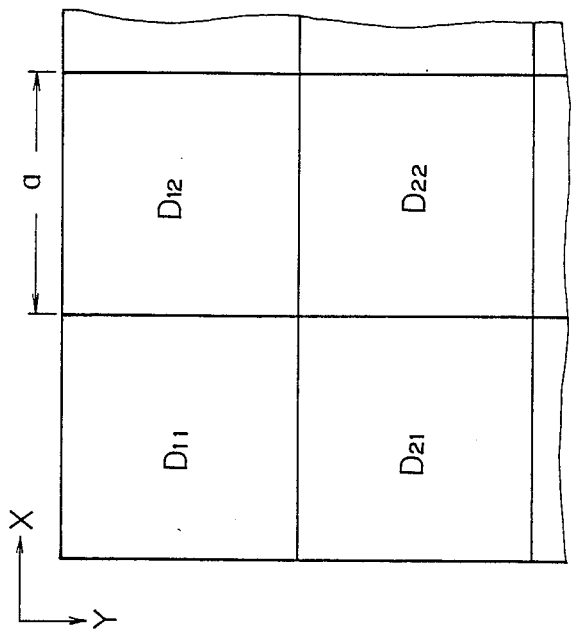
FIGS 11(a) and 11(b) is an explanatory diagram showing screen pattern data and screen pattern signal of the second embodiment.
Figure 11B:
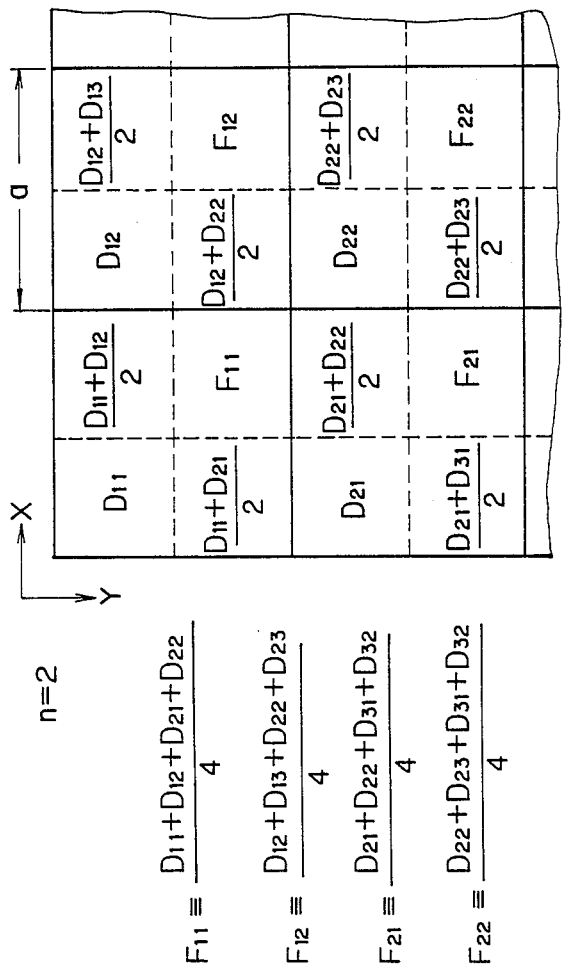

These data are given to a selector 44 and are sequentially selected and outputted in response to a selection signal SL, thereby to obtain the screen pattern signal in time series corresponding to the screen pattern data which is interpolated in each scanning direction. FIG. 11(b) shows the interpolated data obtained by interpolating the data FIG. 11(a) with respect to the case of n=2.

While repeating the above operations, the screen pattern signal generated periodically are processed similarily to the first embodiment. Levels of the screen pattern signal D change for each time interval which is one n-th of the pulse period $T_1$ of the first clock signal $\phi_1$. The feed speed of the photosensitive material 17 in the subscanning direction is taken as one n-th of the conventional feed speed where the interpolation is not performed. The level change interval of the screen pattern signal and the interval of the intensity change control of the laser beam L become one n-th of the light spot diameter d in each scanning direction and the frequencies (densities) of the level change and the control is increased.

Figure 12:
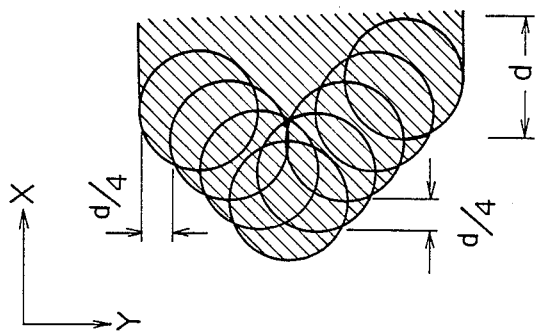
FIGS. 12, 13(a), 13(b), 14(a) and 14(b) are explanatory drawing showing operations of the second embodiment.

FIG. 12 shows an of exposed pattern in a case of n=4. In the second embodiment, there is an advantage where the memory capacity of the screen pattern memory 23 may be less than that of the first embodiment.

Figure 13A:
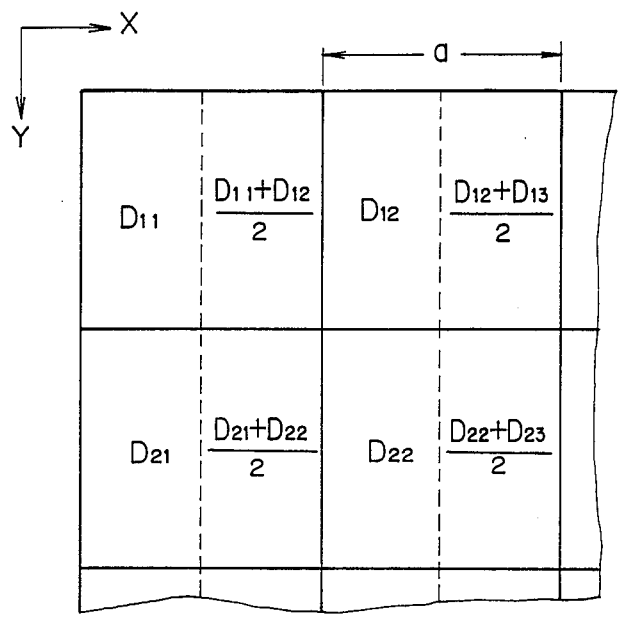
Figure 13B:
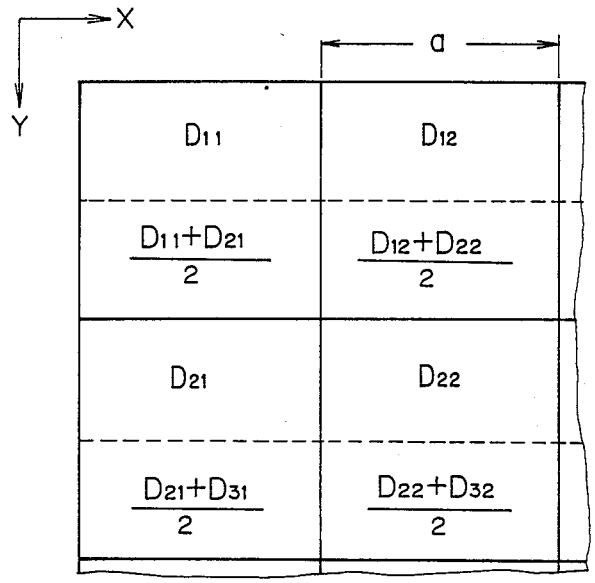
Figure 14A:
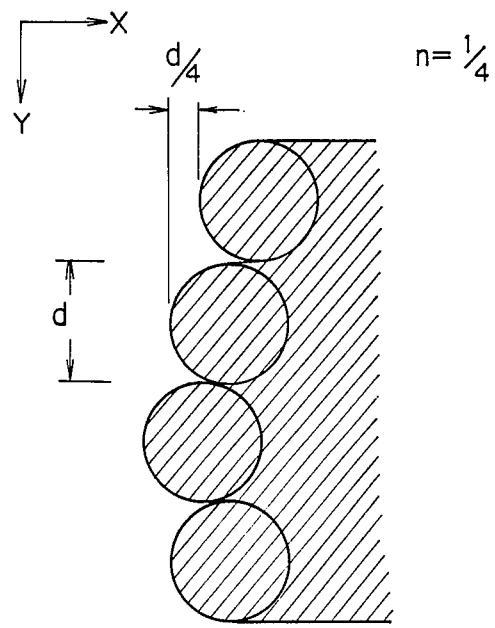
Figure 14B:
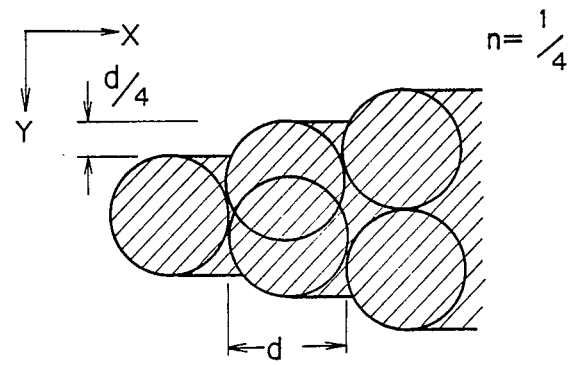

When the subscanning direction interpolation circuit 32 is omitted in the circuit shown in FIG. 10, interpolation will be accomplished only in the main scanning direction and the screen pattern signal D which corresponds to the screen pattern data shown in FIG. 13(a) is obtained. If the main scanning direction interpolation circuit 33 is omitted, only the interpolation in the subscanning direction is accomplished and the screen pattern signal D which corresponds to the data shown in FIG. 13(b) is obtained. In these cases, only with respect to the scanning direction along which the interpolation is performed, an interval of the level change of the screen pattern signal D and an interval of the intensity change control of the laser beam L are shorter than the scanning interval corresponding to the light diameter d, and the density thereof are increased accordingly. FIG. 14(a) shows an exemplary exposure pattern when the interpolation is accomplished only in the main scanning direction and FIG. 14(b) shows an exemplary exposure pattern when the interpolation is accomplished only in the subscanning direction.

Instead of the interpolation circuit 32 and 33 in the second embodiment, a digital filter which smooths the time series digital signals may be employed.

D. Detail of construction and operation of the third embodiment

Figure 15:
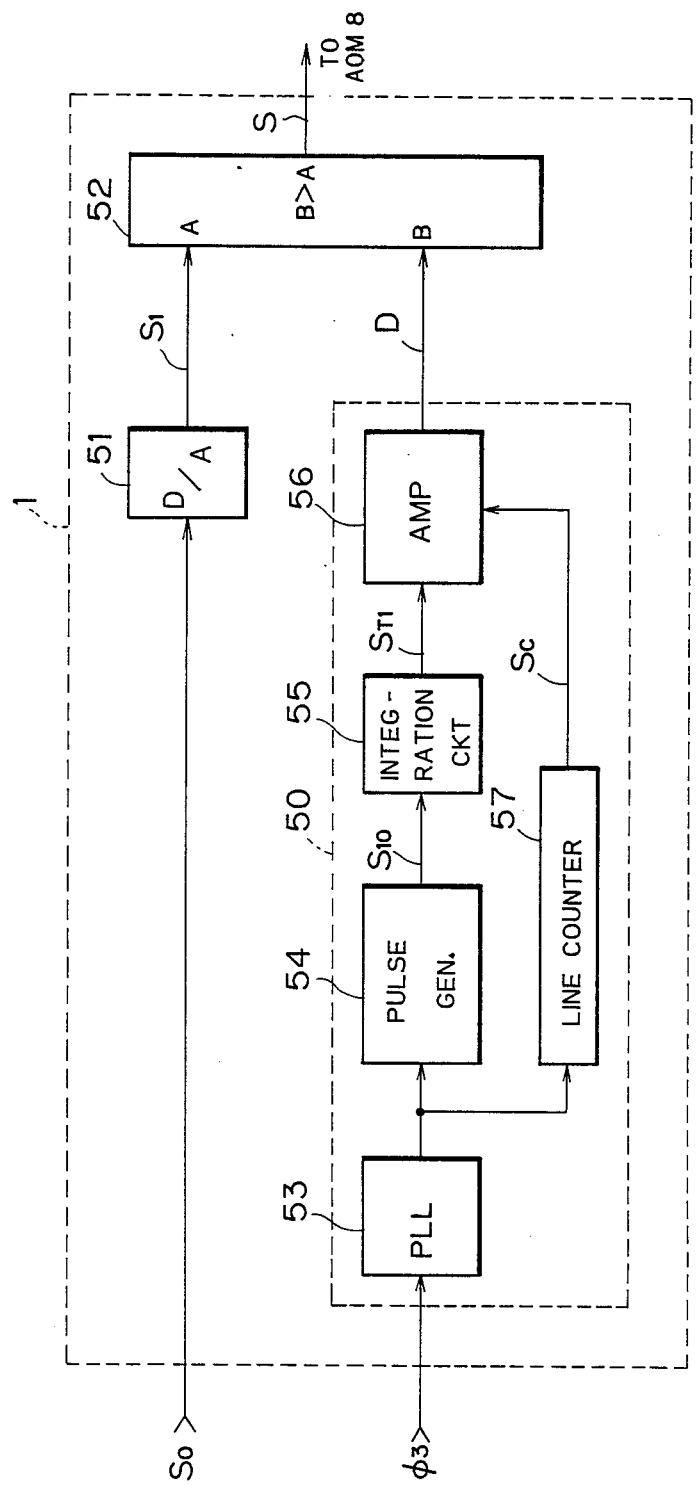
FIG. 15 is a diagram showing an internal structure of third embodiment.

FIG. 15 shows an internal construction of the halftone dot signal generating circuit 1 in the third embodiment. In this embodiment, a periodic triangular wave oscillator 50 which generates analog screen pattern signal D (FIG. 16(d)) is provided. Digital image data $S_0$ (FIG. 16(a)) is converted to analog image signal $S_1$ (FIG. 16(d)) by D/A converter 51. Levels of these signals D and $S_1$ are compared with each other by the analog comparator 52 to obtain the exposure output signal S (FIG. 16(e)). This exposure output signal S is a bi-level signal of "H" and "L" which does not synchronize with the clock signals.

In the triangular wave oscillator 50 shown in FIG. 15, a line feed signal $\phi_3$ synchronized with the scanning operation is given from an encoder provided in the main scanning drive mechanism (not shown) to move the photosensitive material 17 in the main scanning direction. This line feed signal $\phi_3$ is given to PLL circuit 53. A signal which is changed in synchronism with the beam scanning is given to a pulse generating circuit 54 from PLL circuit 53. The pulse generating circuit 54 generates a bipolar pulse $S_{10}$ shown in FIG. 16(b) in response to the signal supplied from the PLL circuit 53. The repeating period $T_a$ of the bipolar pulse $S_{10}$ specify a main scanning time required for scanning by the length of one halftone dot and changes according to the pulse interval of the line feed signal $\phi_3$.

Figure 16:
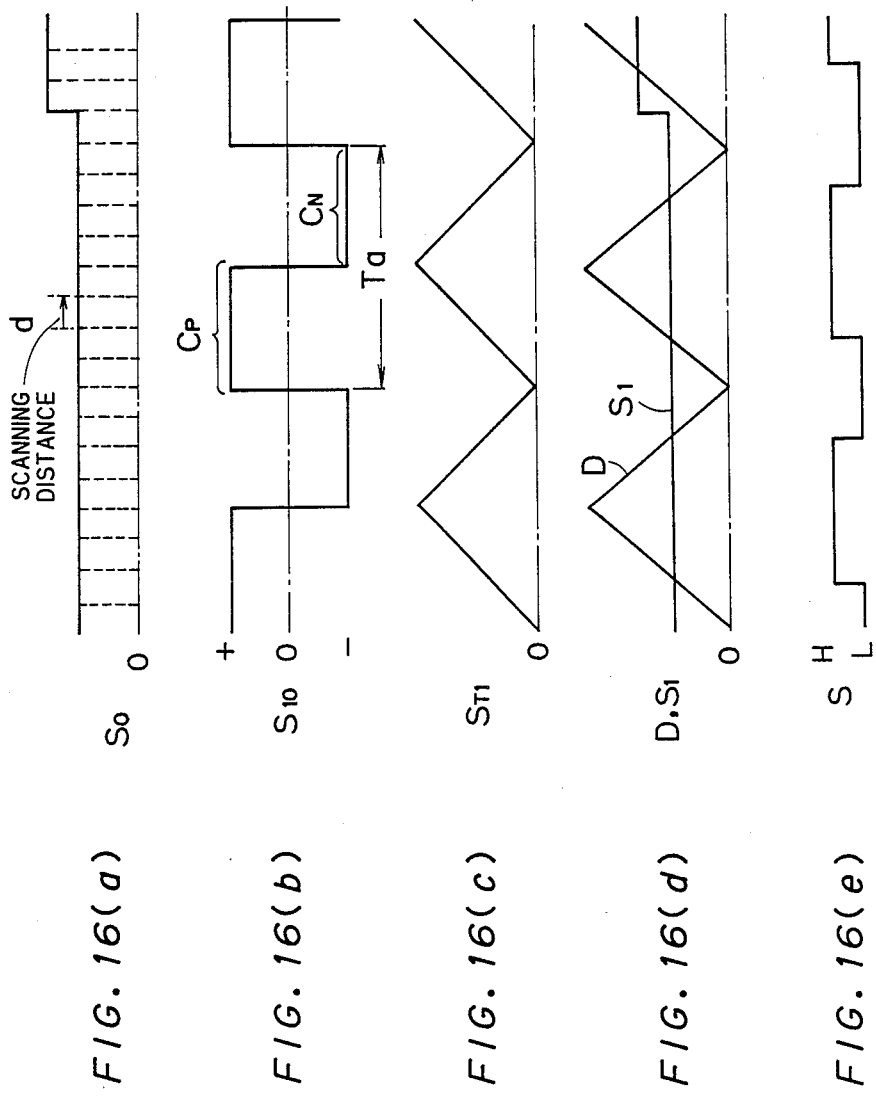
FIGS. 16(a)-(e) are timing charts showing operations of the third embodiment.

The bipolar pulse $S_{10}$ is given to an integration circuit 55 and integrated in time. Therefore, when the positive section $C_p$ and the negative section $C_N$ shown in FIG. 16(b) are symmetrical with each other, a triangular wave $S_{T1}$ shown in FIG. 16(c) can be obtained as the result of the integration. The triangular wave $S_{T1}$ is amplified by the variable gain amplifier 56 to become the analog screen pattern data D shown in FIG. 16 (d).

Figure 17:
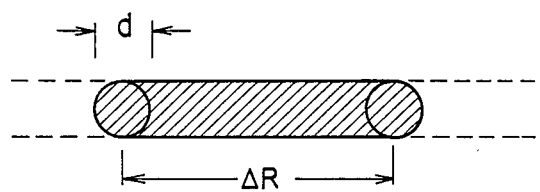
FIG. 17 and FIG. 18 are explanatory diagrams of the third embodiment.

The analog screen pattern data D is a high density data whose level changes for each interval of substantial zero time (therefore, zero scanning distance) and has no quantization error. For this reason, there is no restriction to the level changing timing of the exposure output signal S outputted from the comparator 52 and the intensity change control of the laser beam L is performed continuously (that it, at substantially infinite density of at zero time interval). The exposure interval ΔR (FIG. 17) can have an arbitrary value and the gradation number can be substantially infinite. The screen pitch can also be arbitrary (but should be equal to or greater than d).

In the circuit shown in FIG. 15, the level of the screen pattern data D is changed for each scanning line to obtain a two dimensional halftone dot structure. More specifically, a scanning line currently scanned is found by counting the line feed signal $\phi_3$ by a line counter 57. The line counter 57 outputs to the amplifier 56 a signal $S_c$ whose level changes periodically according to the value of counts.

Figure 18:
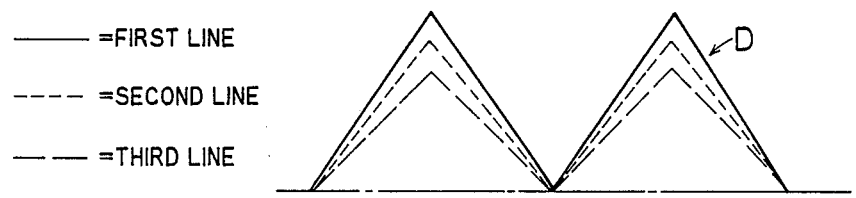

The amplifier 56 is so constructed that its gain is continuously variable in response to the level of the signal $S_c$. For this reason, the number of scanning lines required for scanning an area defined by one halftone dot is set as the preset value $m_0$ of the line counter 57, so that the screen pattern data D whose level changes periodically for each scanning line as shown in FIG. 18 is obtained, where the period of the level change expressed by a number of main scanning lines is $m_0$. Instead of causing the level change shown in FIG. 18, the level change may be caused by uniformly enhancing or depressing the overall level of the screen pattern data D.

E. Detail of construction and operation of the fourth embodiment

Figure 20A:
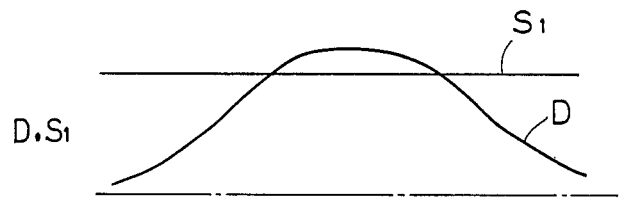
FIGS. 20(a) and 20(b) are explanatory diagrams showing operations of the fourth embodiment.
Figure 20B:
Figure 19:
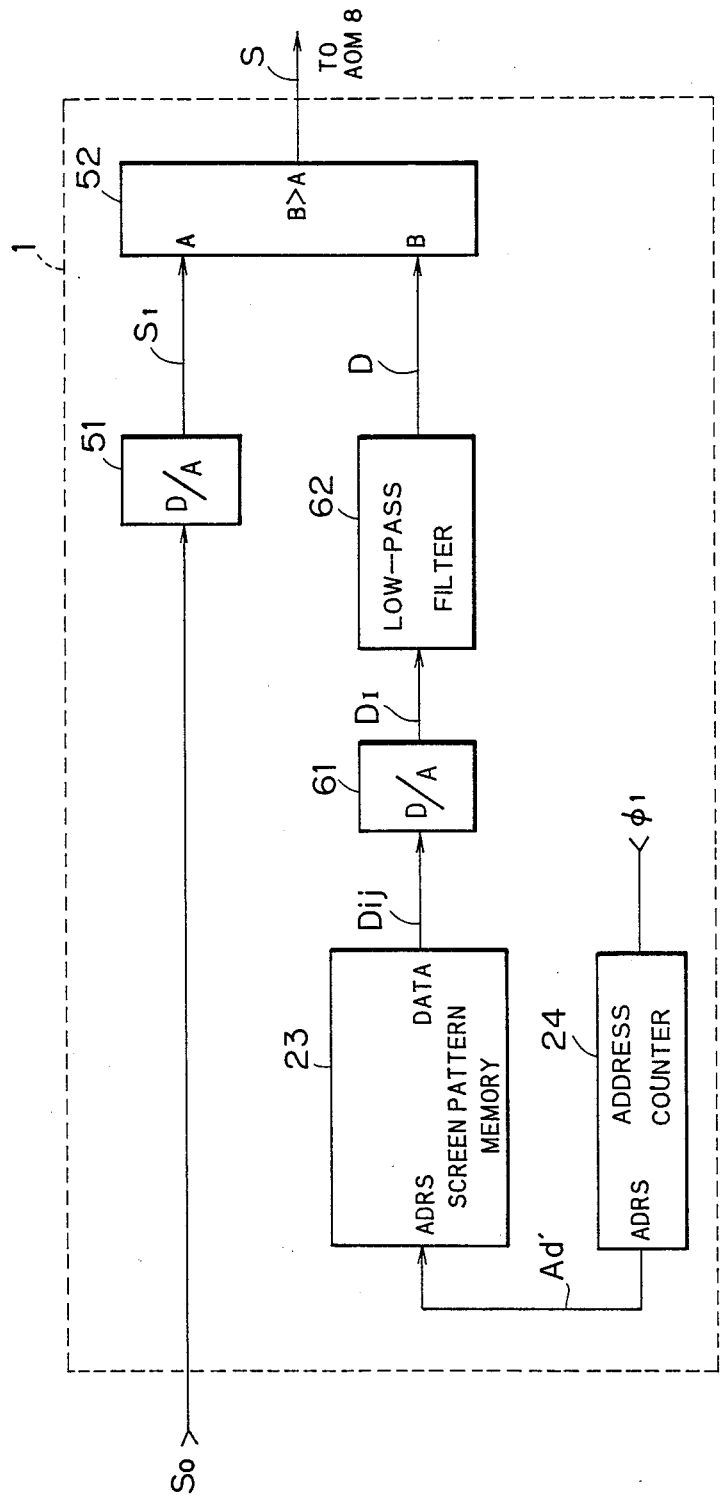
FIG. 19 is a diagram showing an internal structure of fourth embodiment.

FIG. 19 is a diagram showing fourth embodiment. In this embodiment, the screen pattern data $D_{ij}$ is stored in the screen pattern memory 23 for each unit area $A_{ij}$ corresponding to the light spot diameter d shown in FIG. 2. After the data $D_{ij}$ is periodically read out in synchronism with the clock signal $\phi_1$ and converted into an intermediate analog signal $D_I$ by D/A converter 61. High frequency components of the intermediate signal $D_I$ is removed by the analog low-pass filter 62 to accomplish low-pass filtering. The screen pattern signal D obtained by the above becomes the smooth data as shown in FIG. 20(a). Therefore, by comparing the level of an analog image signal $S_1$ obtained through A/D converter 51 and the level of the screen pattern signal D, the exposure output signal S is obtained from an analog comparator 52 as shown in FIG. 20(b).

In this embodiment, both of an interval at which the level of the screen pattern signal D changes and an interval at which the intensity controls of the laser beam L are made shorter than the light spot diameter d to have high density, and the gradation reproducibility of the recorded image is enhanced. This is due to the same reason as that of the third embodiment and therefore the redundant description is omitted.

F. Examples of other versions

Although it is desirable to apply the present invention to the main scanning direction and the subscanning direction, the present invention may be applied to only one scanning direction. When applied to the main scanning direction only, because it is not necessary to change the feed speed of the subscanning operation, there is an effect where the recording speed does not decreased.

In each of the above embodiment, a square halftone dot of 0° screen angle is considered, but the present invention can also be applied to the screen structure other than the above. Further, when the cross section of the light beam for exposure is not a circle, the diameter of the beam spot in the scanning direction to which the present invention is applied is considered to be the light spot diameter d. Therefore, when the present invention is applied to both of the main scanning direction and the subscanning direction, the light spot diameters for both directions may be not identical to each other.

When the present invention is applied to the subscanning direction, a plurality of light beam for exposure may be prepared and multiple exposure may be accomplished by causing these light spots to overlap partially on the photosensitive material. In such a case, the scanning line $l_1$ of FIG. 7(a) can be exposed by the first beam and $l_{12}$ by the second beam, respectively.

In FIG. 7, the digital image data $S_0$ is in synchronism with the first clock signal $\phi_1$. However, the digital image data $S_0$ may be in synchronism with the second clock signal $\phi_1$, or a clock which has larger pulse period than that of the first clock signal $\phi_1$. The latter is employed in a rotary drum type scanner, because the data sampled by about 1/2.5 pitch of the halftone dot is used as the digital image data in the rotary drum type scanner.

Therefore, the input timing of the digital image data may be arbitrary as long as it is synchronized with the record scanning and the number n of division in the main scanning direction can take an arbitrary positive number. In other words, the pulse repeat periods of the first and second clock signals $\phi_1$ and $\phi_2$ may be set arbitrarily, as long as their ratio is a positive number and they are synchronized with each other.

The present invention can be applied not only to the flat bed type scanner but also to various other halftone dot image recording apparatus such as rotary drum type scanner or stationary drum type (inner surface scanning type) scanner.

As have been described above, according to the present invention, because it is possible to change the intensity of the light beam for exposure in every pitch smaller than the light spot diameter of the light beam, the gradation reproducibility of the recorded image is increased even in case the ratio of the screen pitch and the light spot diameter of the light beam is not relatively large.

Also, because it is possible to reduce the intensity changing pitch of the light beam, the degree of freedom in screen pitch selection is increased.

Although the present invention has been described and illustrated in detail, it is not be clearly understood that the same is by way of illustration and example only and is not to be taken by way of limitation, the spirit and scope of the present invention being limited only by the terms of the appended claims.

What is claimed is:

1. An apparatus for recording a halftone dot image on a photosensitive material by emitting a light beam which is modulated on the basis of a digital image data, said halftone dot image including an array of unit areas each of which corresponds to an I×J matrix of regions whose sizes are related to a diameter of said light beam, where I and J are integers larger than one, said apparatus comprising:
(a) image signal generating means for generating an image signal on the basis of said digital image data;
(b) light beam generating means for generating said light beam and emitting it onto a surface of said photosensitive material, said light beam having a prescribed light spot diameter on said surface;
(c) scanning means for relatively moving said light beam and said photosensitive material along a first direction for main scanning and a second direction for subscanning, said main scanning being performed by repeating at a first interval a relative movement of said light beam and said photosensitive material by a distance corresponding to said light beam diameter;
(d) memory means for storing prescribed high density screen pattern data expressing threshold values, the amount of units of said high density screen pattern data being equal to M times that of the regions of said matrix, where M is an integer larger than one;
(e) reading means for sequentially reading out said high density screen pattern data at a second interval from said memory means, where said second interval is substantially 1/M of said first interval;
(f) comparing means for comparing a level of said image signal with a level of said high density screen pattern data being read out from said memory means; and
(g) intensity modulating means for modulating an intensity of said light beam in response to said comparison.

2. An apparatus according to claim 1, wherein said scanning means includes means for generating a first clock signal having a first frequency corresponding to said first interval, and said reading means comprises;
(e-1) a synchronizing signal generator for generating a second clock signal having a second frequency corresponding to said second interval by multiplying said first frequency by M; and
(e-2) an address counter for counting said second clock signal to sequentially designate addresses in said memory means from which said high density screen pattern data are to be read out.

3. An apparatus according to claim 2, wherein said memory means includes a read only memory storing said high density screen pattern data.

4. An apparatus according to claim 3, wherein said subscanning is performed by repeating a relative movement of said light beam and said photosensitive material by a distance smaller than said light beam diameter every one main scanning.

5. A method for recording a halftone dot image on a photosensitive material by emitting a light beam which is modulated on the basis of digital image data, said halftone dot image including an array of unit areas each of which corresponds to an I×J matrix of regions whose sizes are related to a diameter of said light beam, where I and J are integers larger than one, said method comprising:
(a) generating an image signal on the basis of said digital image data;
(b) generating said light beam and emitting it onto a surface of said photosensitive material, said light beam having a prescribed light spot diameter on said surface;
(c) a scanning said light beam relative to said photosensitive material along a first direction for main scanning and a second direction for subscanning, said main scanning being performed by repeating at a first interval a movement of said light beam relative to said photosensitive material by a distance corresponding to said light beam diameter;
(d) storing in memory prescribed high density screen pattern data expressing threshold values, the amount of said high density screen pattern data being equal to M times that of the regions of said matrix, where M is an integer large than 1;
(e) sequentially reading out from memory said high density screen pattern data at a second interval, wherein said second interval is substantially 1/M of said first interval;
(f) comparing a level of said image signal with a level of said high density screen pattern data being read out from said memory means; and
(g) modulating an intensity of said light beam in response to said comparison.

6. A method according to claim 5, wherein said scanning step comprises generating a first clock signal having a first frequency corresponding to said first interval, and said step of sequentially reading comprises;
(e-1) generating a second clock signal having a second frequency corresponding to said second interval by multiplying said first frequency by M; and
(e-2) counting said second clock signal to sequentially designate addresses in said memory from which said high density screen pattern data are to be read out.

7. A method according to claim 6, wherein said step of sequentially reading further comprises accessing a read only memory storing said high density screen pattern data.

8. A method according to claim 7, wherein
said scanning step further comprises moving said light beam relative to said photosensitive material in said second direction for subscanning by a distance smaller than said light beam diameter after completion of each scan along said first direction for main scanning.

9. An apparatus for recording halftone dot images on a photosensitive material on the basis of digital image data, said apparatus comprising:
(a) image signal generating means for generating image signals on the basis of said digital image data, said image signal generating means comprising D/A conversion means for converting said digital image data into an analog image signal,
(b) screen pattern signal generating means for generating a periodic screen pattern signal,
(c) comparing means for comparing a level of said image signal with a level of said screen pattern signal,
(d) light beam generating means for generating a light beam to be irradiated on a photosensitive surface of said photosensitive material, said light beam having a prescribed light spot diameter on said photosensitive surface of said photosensitive material,
(e) intensity modulating means for modulating an intensity of said light beam according to a result of comparison in said comparing means, and
(f) scanning means for relatively moving said light beam and said photosensitive material thereby to scan said photosensitive surface by said light beam, said screen pattern signal generating means having
(b-1) high density analog screen pattern signal generating means for generating a high density analog screen pattern signal whose level is changed at predetermined time intervals shorter than a time interval in which scanning by said scanning means advances by said light spot diameter, and (b-2) high density screen signal transfer means for transferring said high density screen pattern signal to said comparing means as said screen pattern signal.

10. An apparatus according to claim 9, wherein relative movements of said light beam and said photosensitive material by said scanning means include movement in first direction for main scanning and a relative movement in second direction for subscanning, scanning lines on said photosensitive surface, along which said light beam is scanned, are substantially defined by the relative movement in said first direction, said analog screen pattern signal generating means comprises:

analog oscillation means for generating a periodic analog signal, amplifying means for amplifying said periodic analog signal, and means for changing a gain of said amplifying means depending on a scanning line on which said main scanning is currently carried out by said light beam, said analog screen pattern signal being obtained from an output of said amplifying means.

11. An apparatus according to claim 9, wherein said analog screen pattern signal generating means comprises:

memory means for storing prescribed digital screen pattern data,

D/A conversion means for sequentially reading out said digital screen pattern data from said memory means to convert said digital screen pattern data into an analog intermediate signal, and a low-pass filter for carrying out low-pass filtering of said analog intermediate signal, said analog screen pattern signal being generated on the basis of an output of said low-pass filter.

12. A method for recording halftone dot images on a photosensitive material on the basis of digital image data, said method comprising the steps of:

(a) generating an analog image signal on the basis of said digital image data, comprising the step of (a-1) converting said digital image data into an analog image signal, (b) generating a periodic screen pattern signal, (c) comparing a level of said image signal and a level of said screen pattern signal, (d) generating a light beam to be irradiated on a photosensitive surface of said photosensitive material, said light beam having a prescribed light spot diameter on said photosensitive surface of said photosensitive material, (e) modulating an intensity of said light beam in response to the comparison in step (c), and (f) moving said light beam relative to said photosensitive material to scan said photosensitive surface by said light beam in increments equal to said light spot diameter, said step (b) including the steps of (b-1) generating a high density analog screen pattern signal whose level changes at predetermined time intervals shorter than a time interval in which scanning by said step (f) is advanced by said light spot diameter, and (b-2) obtaining said screen pattern signal for said step (c) from said high density screen pattern signal.

13. A method according to claim 12, wherein relative movements of said light beam and said photosensitive material by said scanning means include a relative movement in first direction for main scanning and a relative movement in second direction for subscanning, scanning lines on said photosensitive surface along which said light beam is scanned are substantially defined by the relative movement in said first direction, said step (b-1) comprises the steps of:

generating a periodic analog signal, amplifying said periodic analog signal by amplifying means, and changing a gain of said amplifying means depending on a scanning line currently scanned by said light beam, said analog screen pattern signal being obtained from said amplifying means.

14. A method according to claim 12, wherein said step (b-1) includes the steps of:

storing in memory means prescribed digital screen pattern data provided with values corresponding to a unit element area pattern on said photosensitive surface, said unit element area corresponding in size to said light spot diameter, sequentially reading out said digital screen pattern data from said memory means to convert said digital screen pattern data into analog intermediate signal, and carrying out low-pass filtering of said analog intermediate signal thereby to obtain said analog screen pattern signal.

* * * * *